(12) United States Patent
Blöchl et al.

(10) Patent No.: US 6,309,009 B1
(45) Date of Patent: Oct. 30, 2001

(54) ROOF-LINER ATTACHMENT FOR MOTOR-VEHICLE CONVERTIBLE TOP

(75) Inventors: Armin Blöchl, Altreichenau; Manfred Kasparak, Neureichenau, both of (DE)

(73) Assignee: Parat Automotive Schoenbach GmbH + Co. KG, Remscheid (DE)

(*) Notice: Subject to any disclaimer, the term of this patent is extended or adjusted under 35 U.S.C. 154(b) by 0 days.

(21) Appl. No.: 09/722,257

(22) Filed: Nov. 24, 2000

(30) Foreign Application Priority Data

Nov. 25, 1999 (DE) ............................................. 199 56 801

(51) Int. Cl.[7] ........................................................ B60J 1/18
(52) U.S. Cl. ................................... 296/107.06; 296/146.14
(58) Field of Search ............................. 296/146.14, 214, 296/107.06

(56) References Cited

U.S. PATENT DOCUMENTS 5,540,476 * 7/1996 Cowsert ....................... 296/107.06 X
6,102,467   8/2000 Laurain .
6,152,518 * 11/2000 Schonenbach ................. 296/107.06

FOREIGN PATENT DOCUMENTS 88 08 137   10/1988 (DE) .
299 03 832   7/1999 (DE) .

* cited by examiner

Primary Examiner—Joseph D. Pape
(74) Attorney, Agent, or Firm—Herbert Dubno; Andrew Wilford

(57) ABSTRACT

A motor-vehicle convertible top has an outer cover formed with a window opening having an edge, a window having an outer edge secured to the outer-cover edge, and at least one hook fixed to the edge at a side of the opening and open toward the opening. A flexible liner generally similar to the cover has an edge extending along the side of the opening and formed with a pocket. A bar set in the pocket is fitted to the hook. The pocket is formed with an opening through which the hook engages directly with the bar. There are a plurality of the hooks spaced along the side of the opening and the pocket is formed with a plurality of the holes through which the respective hooks engage.

8 Claims, 4 Drawing Sheets

ROOF-LINER ATTACHMENT FOR MOTOR-VEHICLE CONVERTIBLE TOP

FIELD OF THE INVENTION

The present invention relates to a motor-vehicle convertible top or roof. More particularly this invention concerns a system for attaching the roof liner of such a top adjacent a window set in the top.

BACKGROUND OF THE INVENTION

A standard motor-vehicle convertible top comprises a framework of rigid struts supporting an outer cover layer comprised normally of a waterproof canvas. A hole in the cover layer is fitted with a window which is made of a transparent plastic or glass and is normally provided at the rear, although a so-called sun-roof can be mounted horizontally over the passenger compartment. Internally the top has a liner which conceals the framework and which is connected around the periphery of the window. Insulation for sound and heat may be provided between the liner and the outer cover.

German utility model 88 08 137 describes a system where the liner is fitted with one half of a slide fastener whose other half is mounted on the window edge. Thus the two halves can be zipped together to secure the liner in place. Such an arrangement is quite complex, requires a perfect fit, and even so is often not strong enough to hold the liner under the tension it is subjected to when the roof is up.

In German utility model 299 03 832 and U.S. Pat. application Ser. No. 09/414,617 another system is shown where the convertible-roof window has an outside edge juxtaposed with an inside edge of an outer frame. An annular molded seal fixed to and extending between the window and frame edges secures the window in the frame and is formed with a plurality of spaced and inwardly open seats. The liner formed with a window hole has an inside edge juxtaposed with the seal. A stiff mounting strip extends along and is fixed to at least a portion of the window-hole inside edge of the liner. Respective outwardly directed mounting tabs unitarily formed with the mounting strip are snugly fitted in the seats. The inside liner edge is folded over and forms an elongated pocket receiving the stiff strip. In addition the liner edge is formed at the pocket with respective holes through which the tabs project. The liner edge is stitched adjacent the strip to close the pocket. This construction is fairly simple and neat, but it is possible for the tabs to pull out of the seats, allowing the liner to come loose.

In U.S. Pat. No. 6,102,467 of Laurain a complex system is described involving screwed-together trim strips that capture the outer cover layer and inner liner and clamp their edges to the outside and inside faces of the window. This arrangement is quite expensive and makes it difficult to remove or repair the window or liner.

OBJECTS OF THE INVENTION

It is therefore an object of the present invention to provide an improved attachment system for a roof liner of a motor-vehicle convertible top.

Another object is the provision of such an improved attachment system for a roof liner of a motor-vehicle convertible top which overcomes the above-given disadvantages, that is which is of simple and inexpensive construction and which firmly holds the roof liner with the top up or down.

SUMMARY OF THE INVENTION

A motor-vehicle convertible top has according to the invention an outer cover formed with a window opening having an edge, a window having an outer edge secured to the outer-cover edge, and at least one hook fixed to the edge at a side of the opening and open toward the opening. A flexible liner generally similar to the cover has an edge extending along the side of the opening and formed with a pocket. A bar set in the pocket is fitted to the hook. The pocket is formed with an opening through which the hook engages directly with the bar. In practice there are a plurality of the hooks spaced along the side of the opening and the pocket is formed with a plurality of the holes through which the respective hooks engage.

The result is a very neat and solid connection of the liner to the edge of the window opening. The connection is easy to make and undo, and the normal tension of the liner keeps the connection tight. The bar set in the pocket extends perfectly parallel along the window-opening edge so the liner fits very tightly around the window.

According to the invention the hooks each have one leg fixed to the outer-cover edge and another leg elastically displaceable toward and away from the respective one leg. The bar is gripped between the legs of the hooks. Thus even when the top is down, the bar will not slip out of the hooks. Adhesive spots secure the one legs of the hooks to the outer-cover edge.

The outer cover is provided with a trim strip extending along the edge and engaging an inner face of the window. The adhesive spots are on the trim strip. The outer edge of the window pane is fixed between the trim strip and the outer cover, with a glue strip on each side so the window sits essentially flush with the outer cover but the liner is spaced inside the outer cover enough to accommodate sound and thermal insulation.

The bar is rigid but plastically deformable and extends congruently along the side of the opening. It extends along an upper side of the opening. Clips and other means are connected to the liner to each side of the window adjacent its lower edge to hold the liner tight in this region.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
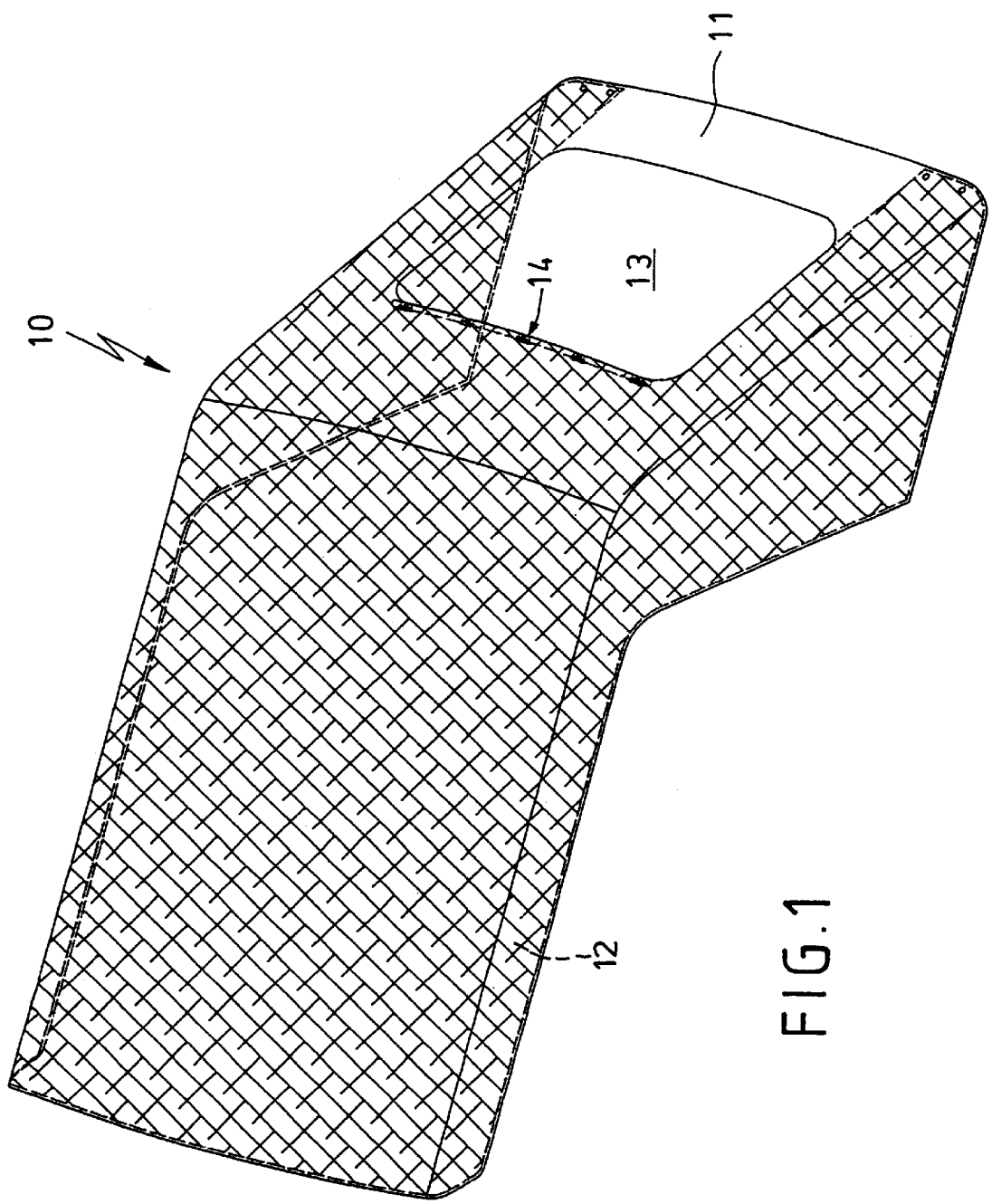
FIG. 1 is a small-scale perspective view of a motor-vehicle convertible top according to the invention.

As seen in FIG. 1 a motor-vehicle convertible top 10 has a waterproof outer layer or cover 11 stretched over an unillustrated frame and a liner 12 extending over the hatched region. A rear window 13 set in an opening 15 of the outer layer 11 is connected at a rail-attachment assembly 14 to the liner 12 which as illustrated does not extend below this window 13 but otherwise is nearly perfectly congruent to the outer cover 11.

Figure 2:
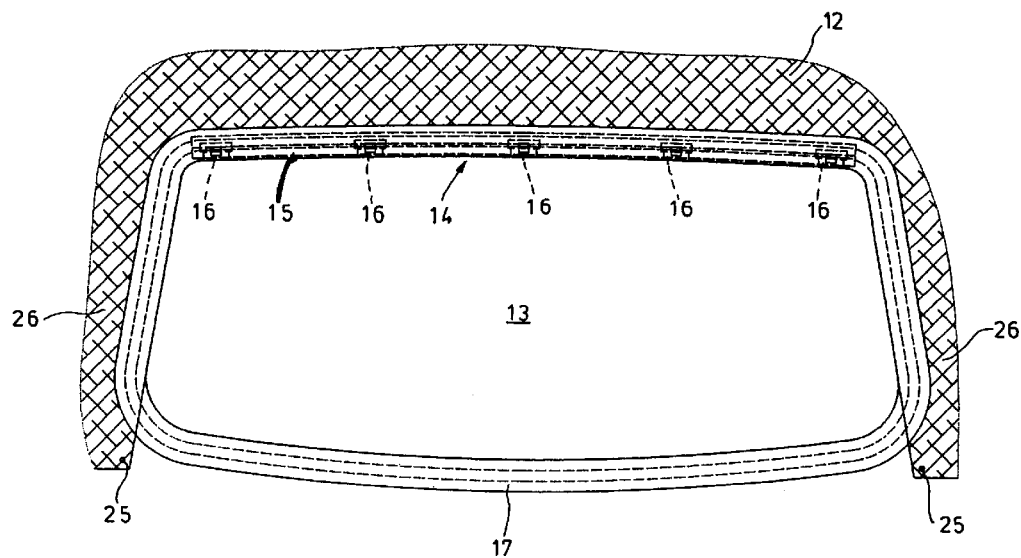
FIGS. 2 and 3 are views outside and inside, respectively of the window region of the top.
Figure 3:
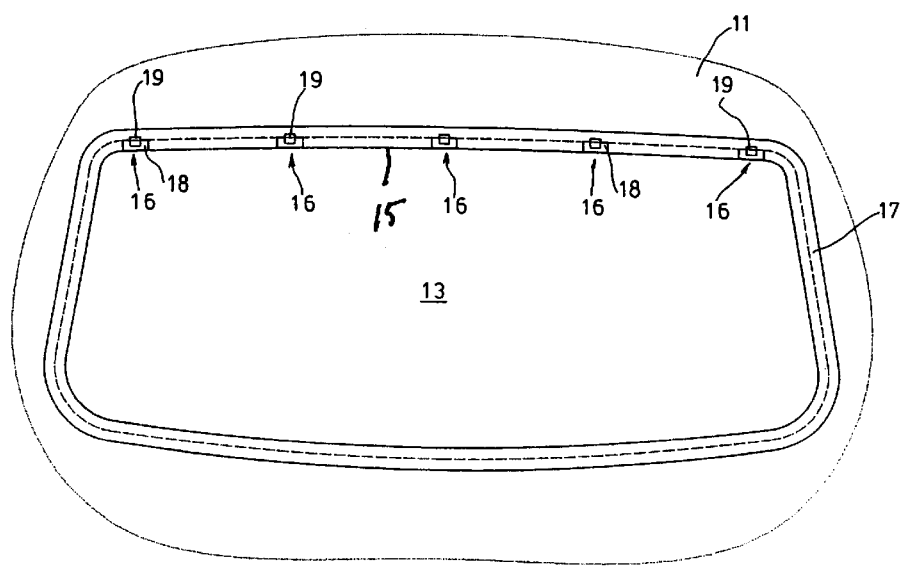
Figure 4:
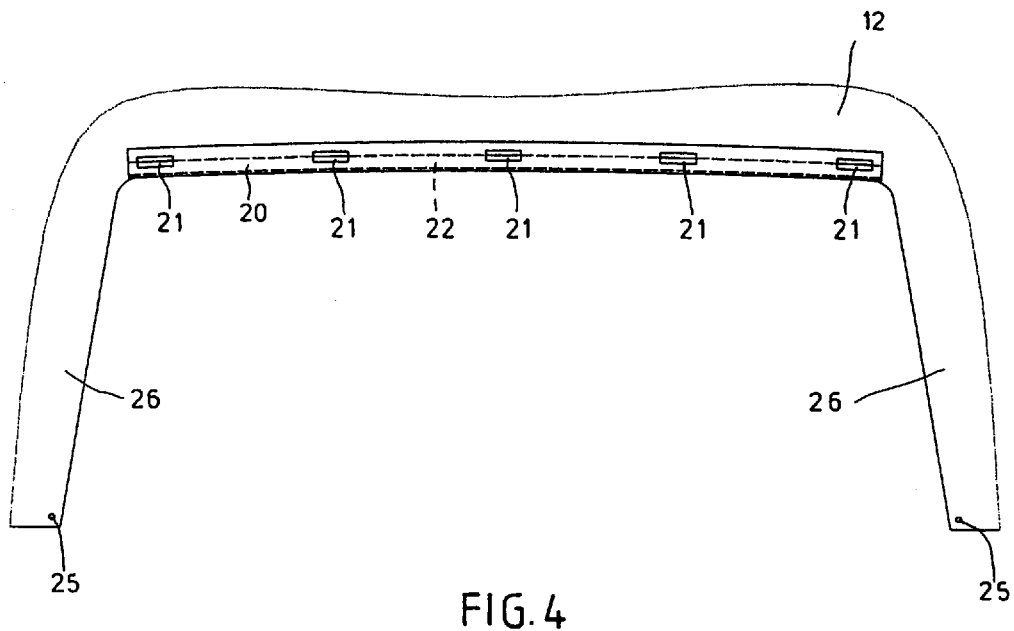
FIG. 4 is a view from outside of the window region of the roof liner.
Figure 5:
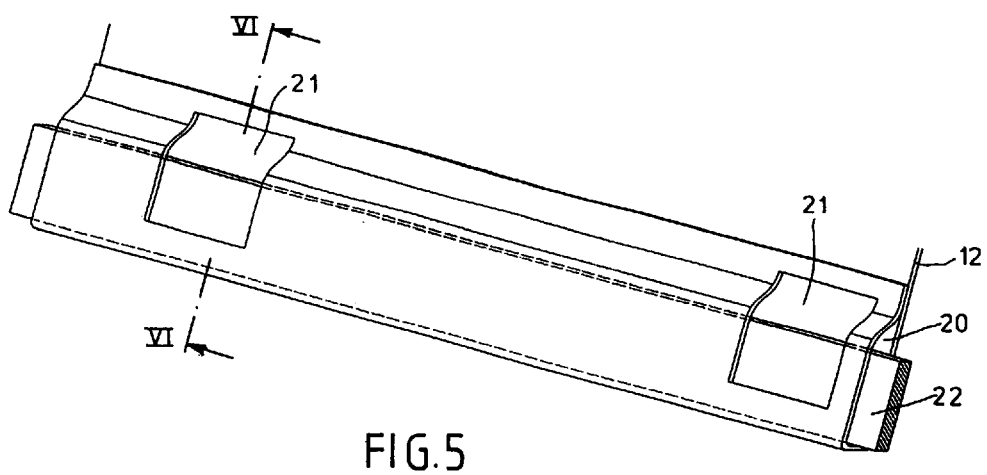
FIG. 5 is a large-scale perspective view of a detail of the roof liner.
Figure 8:
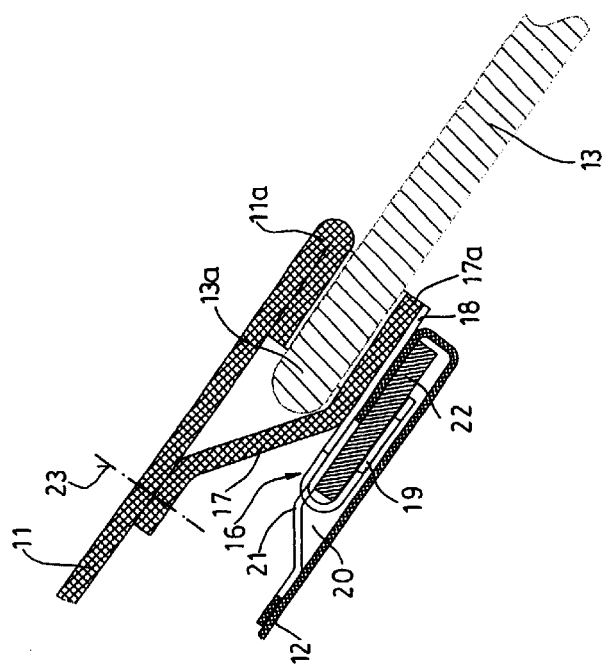
FIG. 8 is a view like FIGS. 6 and 7 showing the liner connected to the window edge.

FIGS. 2 and 3 show how the outer layer 11 is provided with an edge strip 17 extending around the opening 15 of the window 13. This strip 17 is provided along an upper edge of the window opening 15 with a plurality of U-shaped clips 16 each having a wide leg 18 secured to the outer-cover edge 17 and a narrow leg 19, forming a U open toward the window opening, here downward.

The trim strip 17 is secured at 23 by stitching or welding to the cover 11 and has an edge 17a secured by an ultrasonically activated adhesive 27 to the inside face of the window pane 13 while the cover 11 has an edge portion 11a that is folded over and secured by another such strip 27 of adhesive to the outer face of an outer edge 13a of the pane 13, thereby solidly and hermetically sealing the glass pane 13 to the cover 11. FIG. 2 shows how side portions 26 of the liner 12 are formed with holes 25 flanking the window 13 that are secured to unillustrated fasteners on the unillustrated vehicle to hold the liner 12 taut.

Figure 7:
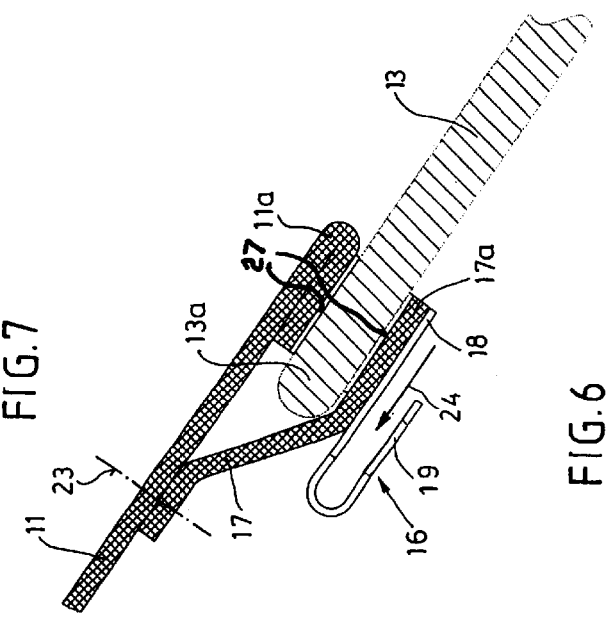
FIG. 7 is a section line FIG. 5 but through the upper window edge.
Figure 6:
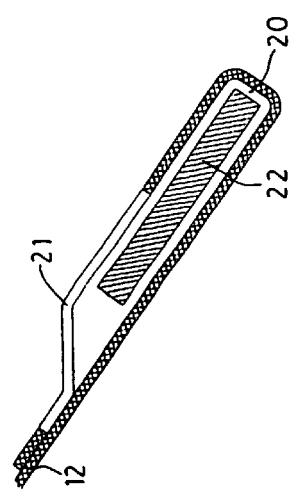
FIG. 6 is a section taken along line VI—VI of FIG. 5.

FIGS. 4 through 8 illustrate how the edge of the liner 12 at the upper edge of the window 13 is formed with a pocket 20 in which is set a bar 22 exposed at a plurality of holes 21 that are spaced at the same distance as the clips 16. The bar 22 is of rectangular and solid cross section and is made of a rigid but plastically deformable material, normally a metal like aluminum, so that it can be permanently shaped to comply perfectly to the shape of the upper edge of the window opening. The clips 16 act as hooks into which the bar 22 can be slid in direction 24 as shown in FIG. 7 to form the assembly of FIG. 8.

To install the liner 11 the bar 22 is bent to the desired shape and then is pulled past the downwardly open mouths of the clips 16 which are then fitted into the holes 21 so they engage around the bar 22. The spacing between the legs 16 and 18 of the clips 16 is such that they actually grip the bar 22 and hold it tightly even when the liner 12 is not taut.

We claim:

1. A motor-vehicle convertible top comprising:

an outer cover formed with a window opening having an edge;

a window having an outer edge secured to the outer-cover edge;

a hook fixed to the edge at a side of the opening and forming a space open toward the opening and closed away from the opening;

a flexible liner of a shape generally similar to a shape of the cover and having an edge extending along the side of the opening and formed with a pocket; and a bar set in the pocket and fitted to the space of the hook.

2. The liner-attachment system defined in claim 1 wherein the pocket is formed with a hole through which the hook engages directly with the bar.

3. The liner-attachment system defined in claim 2 wherein the system comprises a plurality of the hooks spaced along the side of the opening and the pocket is formed with a plurality of the holes through which the respective hooks engage.

4. The liner-attachment system defined in claim 3 wherein the hooks each have one leg fixed to the outer-cover edge and another leg elastically displaceable toward and away from the respective one leg, the bar being gripped between the legs of the hooks.

5. The liner-attachment system defined in claim 4, further comprising adhesive spots on the outer cover securing the one legs of the hooks to the outer-cover edge.

6. The liner-attachment system defined in claim 5 wherein the outer cover is provided with a trim strip extending along the edge and engaging an inner face of the window, the adhesive spots being on the trim strip.

7. The liner-attachment system defined in claim 3 wherein the bar is rigid but plastically deformable and extends congruently along the side of the opening.

8. The liner-attachment system defined in claim 3 wherein the side is an upper side of the opening.

* * * * *